United States Patent
Glickman

(10) Patent No.: US 8,413,213 B2
(45) Date of Patent: Apr. 2, 2013

(54) SYSTEM, METHOD AND DEVICE FOR SECURE WIRELESS COMMUNICATION

(75) Inventor: Claudio Glickman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 1047 days.

(21) Appl. No.: 11/022,871

(22) Filed: Dec. 28, 2004

(65) Prior Publication Data

US 2006/0143693 A1 Jun. 29, 2006

(51) Int. Cl.
*G06F 7/04* (2006.01)

(52) U.S. Cl. ............. 726/3; 726/1; 726/2; 726/4; 726/6; 726/14; 726/20; 713/150; 713/151; 713/152; 713/153; 713/154; 713/155; 713/160; 713/168; 380/255; 380/259; 380/270; 709/223; 709/224; 709/225; 709/227; 709/228; 709/229

(58) Field of Classification Search .................. 726/1–6, 726/14, 20; 713/150–155, 160, 168; 380/255, 380/259, 270; 709/223–225, 227–229
See application file for complete search history.

(56) References Cited

U.S. PATENT DOCUMENTS

| 7,277,409 | B1* | 10/2007 | Thermond et al. | 370/328 |
| 2003/0119484 | A1* | 6/2003 | Adachi et al. | 455/411 |
| 2003/0167409 | A1* | 9/2003 | Sussman | 713/201 |
| 2005/0015592 | A1* | 1/2005 | Lin | 713/166 |
| 2005/0055578 | A1* | 3/2005 | Wright et al. | 713/201 |
| 2005/0128989 | A1* | 6/2005 | Bhagwat et al. | 370/338 |
| 2005/0171720 | A1* | 8/2005 | Olson et al. | 702/121 |
| 2007/0180244 | A1* | 8/2007 | Halasz et al. | 713/168 |

OTHER PUBLICATIONS

"Security Policy Management for the Multi-Tier IT Infrastructure of Today's Enterprise", http://www..cosuser..com/technical/security_policy_lnk.htm?source=overture, Dec. 28, 2004.

* cited by examiner

*Primary Examiner* — Edan Orgad
*Assistant Examiner* — Canh Le
(74) *Attorney, Agent, or Firm* — Kacvinsky Daisy PLLC

(57) ABSTRACT

Embodiments of the present invention provide a method, apparatus and system for selecting a wireless communication device for establishing a connection. The method according to some exemplary embodiments of the invention may include selecting a communication device for establishing a connection by determining whether one or more security-related characteristics of the communication device satisfy a security policy corresponding to a selected security class. Other embodiments are described and claimed.

17 Claims, 4 Drawing Sheets

SYSTEM, METHOD AND DEVICE FOR SECURE WIRELESS COMMUNICATION

BACKGROUND OF THE INVENTION

A wireless communication system may include a plurality of stations able to communicate with a plurality of Access Points (APs). In order to establish a secure connection between the stations and the APs, the APs may implement one or more authentication methods, using an authentication server. APs may also implement an encryption algorithm for encrypting/decrypting packets transmitted to or received from the stations. In a given communication system, one or more APs may implement encryption algorithms and/or authentication methods different from those implemented by one or more other APs.

A Network Administrator (NA) may define for the stations a list of APs allowed for connection. The NA may define a profile including configuration details required for connecting to an AP allowed for connection. A station may connect only to APs that are allowed for connection, e.g., according to the list of APs, using a corresponding predefined profile.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
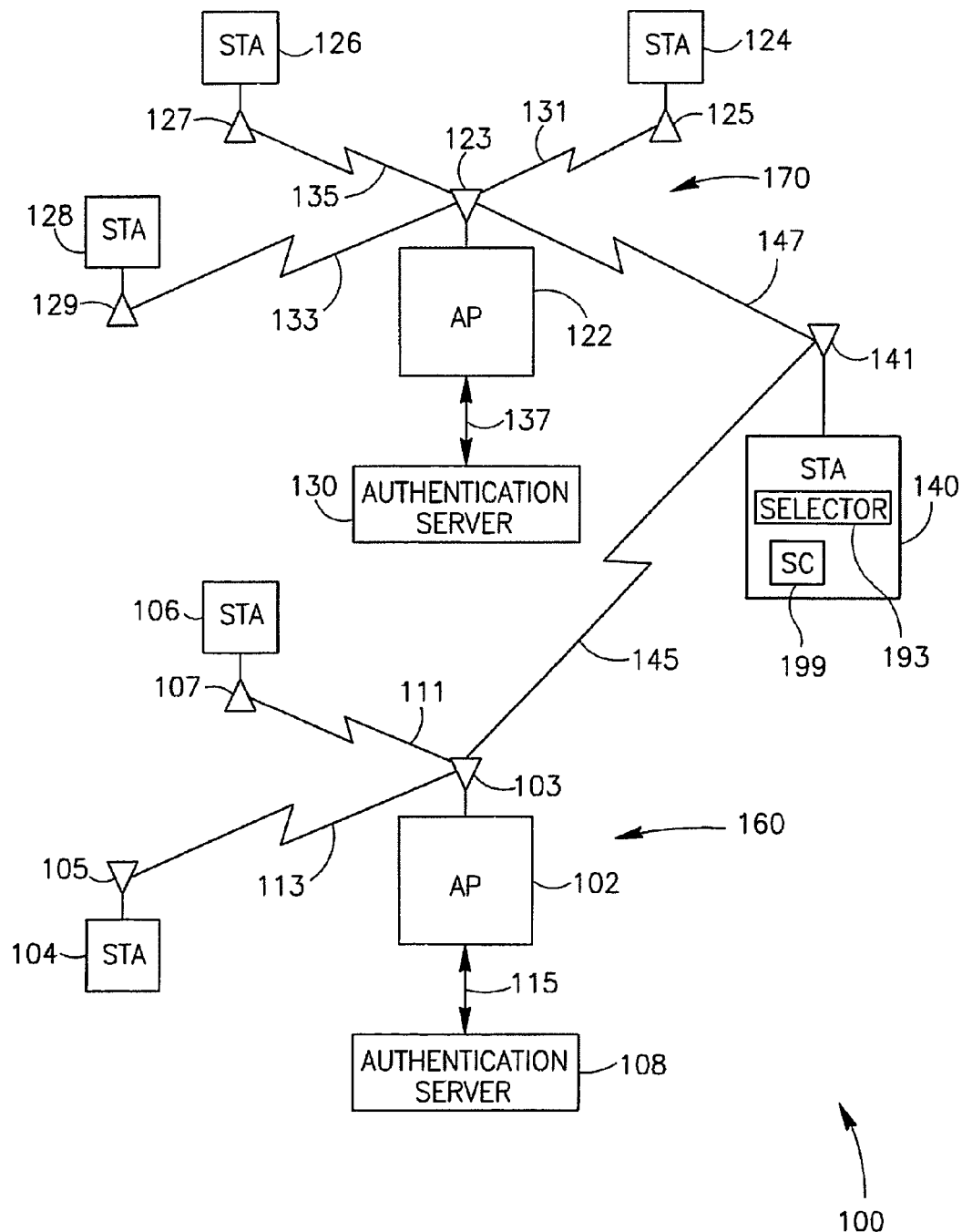
FIG. 1 is a schematic diagram of a wireless communication system in accordance with some exemplary embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the present invention may include apparatuses for performing the operations herein. These apparatuses may be specially constructed for the desired purposes, or they may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, a Dynamic RAM (DRAM), a Synchronous DRAM (SD-RAM), a Flash memory, a volatile memory, a non-volatile memory, a cache memory, a buffer, a short term memory unit, a long term memory unit, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language It will be appreciated that a variety of programming languages may be used to implement the teachings of the invention as described herein.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) communication system and/or in any other unit and/or device. Units of a WLAN communication system intended to be included within the scope of the present invention include, by way of example only, modems, Mobile Units (MU), Access Points (AP), wireless transmitters/receivers, and the like.

Types of WLAN communication systems intended to be within the scope of the present invention include, although are not limited to, WLAN communication systems as described by "IEEE-Std 802.11, 1999 Edition (ISO/IEC 8802-11: 1999)" standard ("the 802.11 standard"), and more particularly in "IEEE-Std 802.11i Supplement to 802.11-1999: Wireless LAN MAC and PHY specifications: Enhanced MAC layer security" ("the 802.11i standard") and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Part of the discussion herein may relate, for exemplary purposes, to transmitting/receiving a packet. However, embodiments of the invention are not limited in this regard, and may include, for example, transmitting/receiving a signal, a block, a data portion, a data sequence, a frame, a data signal, a preamble, a signal field, a content, an item, a message, a protection frame, or the like.

Reference is made to FIG. 1, which schematically illustrates a wireless communication system 100 in accordance with an embodiment of the present invention.

Communication system 100 may include one or more access points, for example, an AP 102 and an AP 122, and one or more communication stations, for example, stations 104, 106, 124, 126, 128 and 140.

In some embodiments, stations 104, 106, 124, 126, 128 and/or 140 may transmit and/or receive one or more packets over wireless links of wireless communication system 100, for example, over links 113, 111, 131, 135, 133, 147 and/or 145. The packets may include data, control messages, network information, and the like.

According to exemplary embodiments of the invention, AP 102 and/or AP 122 may include one or more antennas 103 and/or 123, respectively, for transmitting and/or receiving packets, for example, to/from stations 104, 106, 124, 126, 128 and/or 140, e.g., over links 113, 111, 131, 135, 133, 147 and/or 145. Stations 104, 106, 124, 126, 128 and/or 140 may include one or more antennas 105, 107, 125, 127, 129 and/or 141, respectively, for transmitting and/or receiving packets, e.g., to/from AP 102 and/or AP 122. Although the scope of the present invention is not limited in this respect, types of antennae that may be used for antennas 103, 123, 105, 107, 125, 127, 129 and/or 141 may include but are not limited to internal antenna, dipole antenna, omni-directional antenna, a monopole antenna, an end fed antenna, a circularly polarized antenna, a micro-strip antenna, a diversity antenna and the like.

In some exemplary embodiments of the invention, communication system 100 may include a WLAN system. Although the scope of the present invention is not limited in this respect, communication system 100 may include one or more Basic Service sets (BSS) as are defined by the 802.11 standard. For example, system 100 may include a first BSS 160 including AP 102, and stations 104 and 106, and a second BSS 170 including AP 122, and stations 124, 126 and 128. Each BSS, e.g., BSS 160 and/or 170, may be identified by a corresponding BSSID, as defined by the 802.11 standard.

According to exemplary embodiments of the invention, AP 102 and/or AP 122 may include suitable WLAN AP communication circuitry, for example, AP circuitry able to operate in accordance with the 802.11 standard and/or any other suitable standard. For example, AP 102 may be able to control communication between AP 102 and stations 104, 106 and/or 140 by sending management commands, e.g., commands included in beacon signals ("beacons") that may be sent via wireless links 113, 111, and/or 145, if desired. AP 122 may be able to control communication between AP 122 and stations 124, 126, 128 and/or 140 by sending management commands, e.g., via beacons over wireless links 131, 135, 133 and/or 147, if desired.

According to some exemplary embodiments of the invention, AP 102 and/or AP 122 may be connected, e.g., by a wired or wireless connection, to an authentication server able to authenticate the AP and/or a station attempting to establish a connection with the AP, e.g., in accordance with "IEEE-Std 802.1x Supplement to IEEE Std 802.1D-1998): Port Based Network Access Control" ("the 802.1x standard"). The authentication server may be able to validate a certificate of a station, e.g., station 140, attempting to establish a connection with the AP. For example, AP 102 may be connected, e.g., via a connection 115, to an authentication server 108, and/or AP 122 may be connected, e.g., via a connection 137, to an authentication server 130. Connections 115 and/or 137 may include any suitable communication connection, e.g., a LAN connection or an Internet connection. Alternatively, both AP 102 and 122 may be connected to the same authentication server, e.g., server 108 or 130. Server 108 and/or server 130 may include any suitable authentication server, for example, an Authentication, Authorization and Accounting (AAA) server, e.g., a Remote Authentication Dial-In User Service (RADIUS), as is known in the art.

According to some exemplary embodiments of the invention, an AP, e.g., AP 102, of communication system 100 may have one or more security-related characteristics different from those implemented by one or more other APs, e.g., AP 122.

It will be appreciated that the term "security-related characteristics" as used herein may refer to any one or more characteristics, rules, attributes, algorithms, methods, protocols, standards and/or parameters related to securing, protecting, authenticating, verifying and/or validating a connection between two communication devices, e.g., an AP and a station. For example, the security characteristics of an AP, e.g., AP 102 and/or AP 122, may include a type of encryption algorithm implemented by the AP, e.g., unencrypted, Wired Equivalent Privacy (WEP), Temporal Key Integrity Protection (TKIP), Counter Mode with Cipher Block Chaining Message Authentication Code Protocol (CCMP), and/or any other encryption algorithm, as are known in the art. Additionally or alternatively, the security characteristics of an AP, e.g., AP 102 and/or AP 122, may include a type of authentication method implemented by the AP and/or an authentication server associated with the AP, e.g., no authentication; basic Extension Authentication Protocol (EAP) with or without key management; Wireless Protected Access (WPA); Certificate based mutual authentication; server certificate and tunneled encrypted; server certificate and tunneled encrypted mutual authentication; server certificate and tunneled encrypted certificate based authentication; and/or any other authentication method as are known in the art.

According to some exemplary embodiments of the invention, an AP, e.g., AP 102 and/or AP 122, may be categorized based on one or more AP security-related characteristics, e.g., based on the type of encryption algorithm type and/or the type of authentication method implemented by the AP, as described below.

According to some exemplary embodiments of the invention, an encryption security level (ENCR_SL) of an AP, e.g., AP 102 and/or 122, may be defined, for example, based on the type of encryption algorithm implemented by the AP, e.g., according to the following table:

TABLE 1

| ENCR_SL | Encryption algorithm |
|---|---|
| 1 | Unencrypted |
| 2 | WEP |
| 3 | TKIP |
| 4 | CCMP |

According to some exemplary embodiments of the invention, an EAP security level EAP_SL of an AP, e.g., AP 102 and/or AP 122, may be defined, for example, based on the type of authentication method supported by the AP, e.g., according to the following table:

TABLE 2

| EAP_SL | EAP method type | Exemplary EAP methods |
|---|---|---|
| 0 | No Authentication | — |
| 1 | Basic EAP authentication; no key management. | MD5 |
| 2 | Certificate based mutual authentication. | TLS |
| 3 | Server certificate + tunneled encrypted basic EAP. | TTLS/PAP, CHAP; PEAP/GTC |
| 4 | Server certificate + tunneled encrypted mutual authentication. | TTLS/MS_CHAP_V2; PEAP/MS_CHAP_V2 |
| 5 | Server certificate + tunneled encrypted certificate based authentication. | PEAP/TLS |

According to some exemplary embodiments of the invention, one or more Security Classes (SC) may be determined corresponding to one or more respective security policies. The security policies may include one or more conditions relating to one or more of the security related characteristics, e.g., conditions relating to the EAP_SL and/or ENCR_SL. For example, the following SC may be determined corresponding to the following security policies:

TABLE 3

| SC | Security policy |
|---|---|
| 1 | Max (EAP_SL + ENCR_SL) |
| 2 | m * EAP_SL + n * ENCR_SL >= $SL_{P1}$ |
| 3 | ENCR_SL > 2; EAP_SL = any suitable |
| 4 | EAP_SL is TLS or PEAP/TLS. |
| 5 | EAP_SL = 0; ENCR_SL >= $SL_{P2}$. | wherein $SL_{P1}$, and $SL_{P2}$ are predetermined encryption SL values, and wherein m and n are weighted average parameters, e.g., wherein n<1 and/or m<1.

According to one exemplary embodiment, SC 1 as defined in Table 3 may be used for selecting, from one or more APs, an AP having the highest value of the sum of EAP_SL and ENCR_SL. Additionally according to this example, SC 2 as defined by Table 3 may be used for selecting an AP based on a weighted average of EAP_SL and ENCR_SL of the AP. Additionally according to this example, SC 3 as defined by Table 3 may be used for selecting an AP implementing an encryption algorithm, e.g., TKIP or CCMP, having a SL equal to or higher than two. Additionally according to this example, SC 4 as defined by Table 3 may be used for selecting an AP supporting the TLS or PEAP/TLS authentication, e.g., for establishing a public hot spot, as is known in the art. Finally, according to this example, SC 5 as defined by Table 3 may be used for selecting an AP implementing no authentication, e.g., for establishing a personal BSS, as is known in the art.

It will be appreciated, that any other suitable security policies, e.g., based on the EAP_SL, ENCR_SL, and/or any other security-related characteristic, may be determined in addition to or instead of one or more of the SCs defined above.

According to some exemplary embodiments of the invention, at least one station of system 100, e.g., station 140, may include a SC module 199 for determining a security class related to one or more security-related characteristics, e.g., at least one of an encryption security level and an authentication security level, for establishing secured data transactions over system 100; and/or a selector 193 able to select, according to the determined SC, e.g., a SC determined by a user of station 140, a communication device suitable for connection, e.g., AP 102 or AP 122, based on a security policy corresponding to the determined SC. For example, station 140 may be able to selectively establish a connection with an AP, e.g., AP 102 or AP 122, having one or more security-related characteristics satisfying the security policy corresponding to the determined SC, as described in detail below.

Figure 2:
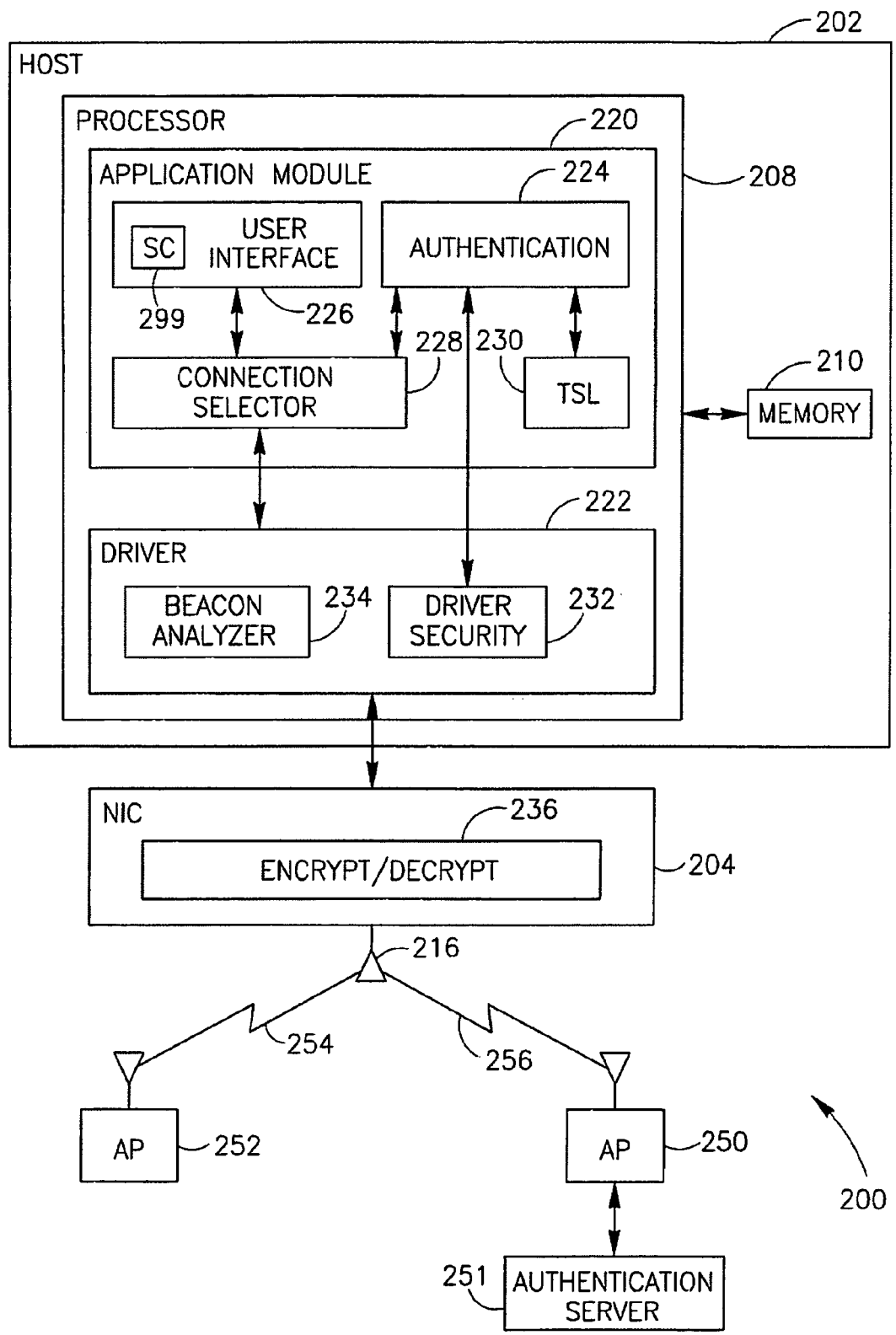
FIG. 2 is a schematic illustration of a communication station in accordance with some exemplary embodiments of the invention.

Reference is made to FIG. 2, which schematically illustrates a station 200 in accordance with some exemplary embodiments of the invention.

Although the invention is not limited in this respect, station 200 may perform the functionality of at least one of stations 104, 106, 124, 126, 128 and 140 (FIG. 1).

According to exemplary embodiments of the invention, station 200 may include a host 202 associated with a wireless communication module, e.g., a Network Interface Card (NIC) 204, as described in detail below.

NIC 204 may include any suitable hardware and/or software able to communicate with one or more wireless communication devices, e.g., via one or more antennas 216. For example, NIC 204 may include a Physical (PHY) layer and a Media Access Controller (MAC), as are known in the art. NIC 204 may be able, for example, to communicate with one or more APs, e.g., APs 250 and/or 252, using one or more beacons, e.g., beacons communicated over wireless links 254 and/or 256, respectively, e.g., as is known in the art. NIC 204 may include an encryption/decryption module 236 able to encrypt packets to be transmitted via antenna 216 and/or decrypt packets received via antenna 216, as is known in the art.

In some embodiments, host 202 may include or may be, for example, a computing platform, e.g., a personal computer, a desktop computer, a mobile computer, a laptop computer, a notebook computer, a terminal, a workstation, a server computer, a Personal Digital Assistant (PDA) device, a tablet computer, a network device, or other suitable computing device.

According to some exemplary embodiments of the invention, host 202 may include an application module 220, which may be associated with a driver 222. According to some exemplary embodiments of the invention, application module 220 and/or driver 222 may be implemented by any suitable software and/or instructions, which may be executed, for example, by a processor 208 associated with a memory 210. Processor 208 may include, for example, a Central Processing Unit (CPU), a Digital Signal Processor (DSP), a microprocessor, a host processor, a plurality of processors, a controller, a chip, a microchip, or any other suitable multipurpose or specific processor or controller.

Application module 220 may be able to produce Transmission (Tx) signals including blocks intended for transmission via antenna 216, and/or to process Reception (Rx) signals including blocks received via antenna 216, e.g., as is known in the art Driver 222 may be able to provide NIC 204 with signals corresponding to Tx signals received from application module 220, and/or to provide application module 220 with Rx signals corresponding to signals received from NIC 204, e.g., in accordance with any suitable communication protocol, as is known in the art.

According to some exemplary embodiments of the invention, driver 222 may be able to search (e.g., scan) a communication system, e.g., communication system 100 (FIG. 1), for one or more service sets (SSs) of one or more APs, e.g., AP 250 and/or AP 252; and to generate a scan list including details of detected SSs. Driver 222 may use any suitable scanning algorithm, e.g., as is known in the art. The scanning list may include, for example, at least one SS identification (SSID), at least one BSS identification (BSSID) corresponding to at least one AP, respectively, and/or any other SS information, as is known in the art. The SSIDs of the scanning list may be arranged, for example, in an order corresponding to the order in which beacons may be received from the APs, as is known in the art.

According to some exemplary embodiments of the invention, driver 222 may include, for example, a beacon analyzer 234 able to analyze signals corresponding to a beacon, e.g., a beacon communicated over wireless link 254 and/or wireless link 256, as is known in the art. Beacon analyzer may determine the type of a cryptographic algorithm implemented by an AP by analyzing the beacon signals transmitted by the AP, as is known in the art. Driver 222 may also include a driver security module 232 able to handle authentication protocol events and/or key material operations, as are known in the art.

Application module 220 may include a user interface 226. User interface 226 may include a SC module 299 for determining a security class related to one or more security-related characteristics, for example, to at least one of an encryption security level and an authentication security level, for establishing secured data transactions over a communication network, as described below. Additionally or alternatively, user interface 226 may be adapted to receive user authentication information, e.g., a user name and/or a password, as described below. For example, interface 226 may include a Graphic User Interface (GUI), as is known in the art. According to some exemplary embodiments of the invention module 299 may be implemented separately from interface 226, for example, if the SC is to be automatically determined, e.g., as described below.

According to some exemplary embodiments of the invention, module 220 may include a selector 228 able to select a communication device suitable for connection, e.g., AP 250 or AP 252, based on the determined SC, as described below with reference to FIG. 3.

Application module 220 may also include an authentication module 224 able to perform an authentication procedure, e.g., a mutual authentication procedure between station 202 and an authentication server via a communication device, e.g., AP 250 and/or AP 252, as described below.

According to some exemplary embodiments of the invention, module 224 may also include a Trusted Server List (TSL) 230, e.g., in the form of a database, for storing details, e.g., identification and/or authentication details, of one or more trusted authentication servers.

The term "trusted authentication server", as used herein, may relate to an authentication server presumed to be a valid server and/or verified to be a valid authentication server, for example, using any authentication validation procedure, e.g., as is known in the art.

TSL 230 may include, for example, for one or more of the trusted authentication servers, the following data: a server name, e.g., identical to a server certificate subject generated by the authentication server; the identity of one or more chain issuers corresponding to a certificate of the authentication server, e.g., as known in the art; a domain name, which may be identical to a domain name extracted from a subject alternative name, e.g., as is known in the art; and/or one or more Trusted Root Certificate (TRC) chains, as are known in the art.

According to other embodiments of the invention, any other suitable hardware and/or software configuration may be implemented for storing the authentication server details.

Figure 3:
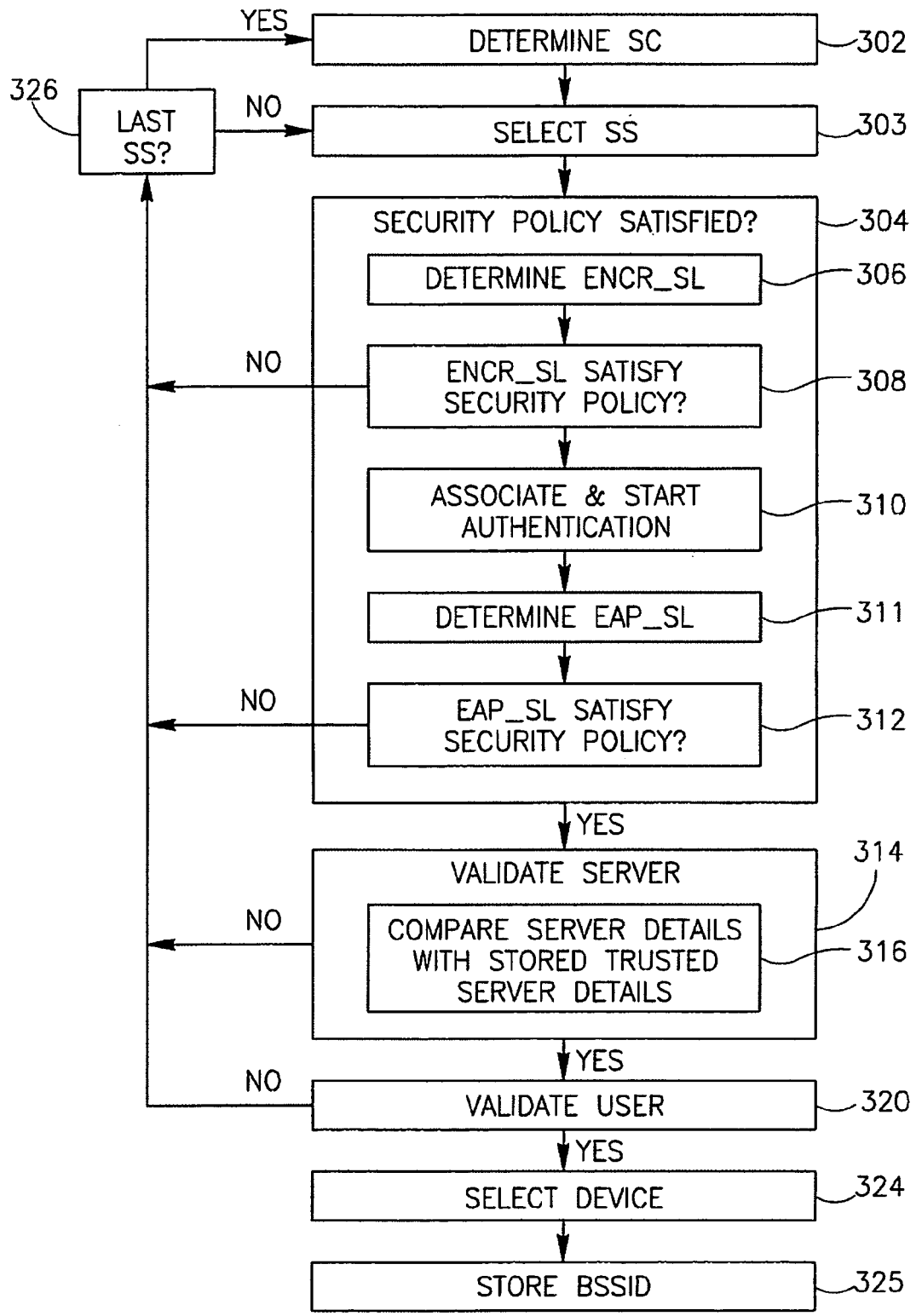
FIG. 3 is a schematic flow chart illustration of a method of selectively connecting to a communication device in accordance with some exemplary embodiments of the invention.

Reference is also made to FIG. 3, which schematically illustrates a method of selectively connecting to a communication device in accordance with some exemplary embodiments of the invention.

Although the present invention is not limited in this respect, the method of FIG. 3 may be implemented by host 202 of station 200 (FIG. 2), e.g., to selectively establish a connection with an AP, e.g., AP 250 or AP 252 (FIG. 2).

A indicated at block 302, the method may include determining a SC. According to some exemplary embodiments of the invention, the SC may be determined by a user, e.g., a user of station 200 (FIG. 2). For example, interface 226 (FIG. 2) may be able to provide the user with a list of SCs. The SCs may correspond, for example, to security policies, which may correspond to one or more security characteristics, e.g., a type of encryption algorithm and/or a type of authentication method, as described above. The user may select a desired SC from the list of SCs. According to some exemplary embodiments of the invention, the user may optionally determine a new SC, e.g., using interface 226, thereby to define a desired security policy corresponding to the new SC. According to other exemplary embodiments of the invention, the SC may be determined automatically, e.g., by application module 220, based on any suitable criteria For example, module 299 may be able to determine a SC according to a predetermined selection scheme, e.g., as described below.

As indicated at block 303, the method may include selecting a SS to be considered, e.g., from the scanning list generated by driver 222 (FIG. 2). A communication device, e.g., an AP that may be suitable for connection ("the considered communication device") may be determined based on the BSSID corresponding to the selected SSID. According to some exemplary embodiments of the invention, a starting index for selecting the SS to be considered may be selected randomly, e.g., to enable a relatively equal distribution of the number of stations connected to each BSS in the communication system and to avoid overloading one or more of the BSSs.

As indicated at block 304, the method may include determining whether the considered communication device corresponds to the determined SC, e.g., by determining whether one or more security-related characteristics of the considered communication device satisfy a security policy corresponding to the SC ("the selected security policy"), as described in detail below. The one or more security-related characteristics may include, for example, the ENCR_SL of the considered AP and/or the EAP_SL of the considered AP, as are described above.

As indicated at block 306, the method may include determining the ENCR_SL of the considered communication device. For example, beacon analyzer 234 (FIG. 2) may be able to determine the cryptographic algorithm type of a considered AP, e.g., AP 250 (FIG. 2), by analyzing a beacon, e.g., a beacon received over link 256 (FIG. 2), from the considered AP. Beacon analyzer 234 (FIG. 2) may use any suitable beacon analysis method as is known in the art The ENCR_SL of the considered AP may be determined, e.g., by selector 228, based on a predefined relation between the cryptographic algorithm type and the ENCR_SL, e.g., using Table 1 above.

As indicated at block 308, the method may include determining whether the ENCR_SL of the considered communication device satisfies the selected security policy. For example, selector 228 (FIG. 2) may compare the ENCR_SL of the considered AP with an ENCR_SL condition corresponding to the selected security policy. For example, the selected security policy may include the condition ENCR_SL>2, e.g., if SC 3 as defined in Table 3 above is selected.

According to some exemplary embodiments of the invention, the method may include denying connection to the considered communication device, e.g., if the ENCR_SL of the considered communication device does not satisfy the ENCR_SL condition. Accordingly, the method may include determining whether there are any other SSs, e g., of the scanning list, which were not yet considered, as indicated at block 326. For example, beacon analyzer 234 (FIG. 2) may determine there are no other SSs to be considered, e.g., if all the SS on the scanning list have been considered.

According to some exemplary embodiments of the invention, the method may include determining another SC as indicated at block 302, e.g., if a communication device satisfying the selected security policy has not been detected after considering all the SSs on the scanning list. For example, user interface 226 (FIG. 2) may be able to inform the user that communication to a device satisfying the determined SC is not available. User interface 226 (FIG. 2) may also be able to prompt the user to determine another SC. According to some exemplary embodiments, another SC may be determined automatically, e.g., according to a predetermined SC selection scheme. For example, the method may include connecting to a communication device based on a predetermined default SC, e.g., if no communication device is determined to satisfy one or more of the determined SCs. The default SC may include, for example, SC 0 as defined in Table 1, e.g., to enable connection to a communication device having a maximum value of the sum of EAP_SL and ENCR_SL.

As indicated at block 310, the method may include performing an association procedure and starting an authentication procedure with the considered communication device, e.g., if the ENCR_SL of the considered communication device satisfies the ENCR_SL condition corresponding to the selected security policy. Any suitable algorithm, e.g., as is known in the art, may be implemented for performing the association procedure and for starting the authentication procedure.

As indicated at block 311, the method may include determining the EAP_SL of the considered communication device. For example, the considered AP may support one or more authentication method types. During the authentication procedure, a scan of the supported authentication method types may be performed, e.g., as is known in the art. According to some exemplary embodiments of the invention, one or more EAP_SLs corresponding to the type of the one or more authentication methods supported by the considered AP may be determined. For example, selector 228 (FIG. 2) may determine the one or more EAP_SLs based on a predefined relation between the authentication method type and the EAP_SL, e.g., in accordance with Table 2.

As indicated at block 312, the method may include determining whether the EAP_SL supported by the considered communication device satisfies the selected security policy. For example, selector 228 (FIG. 2) may compare the one or more supported EAP_SLs with an EAP_SL condition corresponding to the selected security policy. The selected security policy may include, for example, the condition ENCR_SL>2, if SC 3 as defined in Table 3 is selected. In another example, AP 250 (FIG. 2) may support the MD5 (EAP_SL≠3), PEAP/TLS (EAP_SL≠3) and TLS (EAP_SL≠3) authentication method types; AP 252 (FIG. 2) may support the TLS (EAP_SL≠3) and PEAP/GTC (EAP_SL=3) authentication method types; and the selected security policy may include the EAP_SL condition EAP_SL=3. In this case, if AP 250 (FIG. 2) is considered before AP 252 (FIG. 2), then selector 228 (FIG. 2) may compare the first, second and third authentication method types supported by AP 250 (FIG. 2) with the EAP_SL condition. Selector 228 (FIG. 2) may determine that AP 250 (FIG. 2) does not satisfy the selected security policy, if none of the authentication method types supported by AP 250 (FIG. 2) satisfy the EAP_SL condition. When considering AP 252 (FIG. 2), selector 228 (FIG. 2) may compare the first authentication method type supported by AP 252 (FIG. 2) with the EAP_SL condition. After determining that the first authentication method type of AP 252 (FIG. 2) does not satisfy the EAP_SL condition, selector 228 (FIG. 2) may compare the second authentication method type supported by AP 252 (FIG. 2) to the EAP_SL condition, and determine the second authentication method type of AP 252 (FIG. 2) satisfies the selected security policy.

According to some exemplary embodiments of the invention, the method may include denying connection with the considered communication device, e.g., if the EAP_SL of the considered communication device does not satisfy the EAP_SL condition According to these embodiments, the method may include determining whether there are any other SSs that have not yet been considered, as described above with reference to block 326.

Some exemplary embodiments of the invention, e.g., as described above with reference to block 304, may relate to security policies defined by an ENCR_SL condition and an EAP_SL condition, which are independent from each other. Such policies may include, for example, one or more of the security policies corresponding to SC 3, SC 4, and/or SC 5 of Table 3. According to these exemplary embodiments, determining whether the security-related characteristics satisfy the security policy may include independently determining whether the ENCR_SL satisfies the ENCR_SL condition, and whether the EAP_SL satisfies the EAP_SL condition, e.g., as described above with reference to blocks 308 and 312. However, other embodiments of the invention may relate to security policies corresponding to a combination of the ENCR_SL condition and/or the EAP_SL condition, e.g., the security policies corresponding to SC 1 and/or SC 2 of Table 3. It will be appreciated that according to these embodiments of the invention, the method may be modified to include determining the ENCR_SL and/or EAP_SL, e.g., as described above with reference to blocks 306 and/or 311; and determining whether a combination of the EAP_SL and ENCR_SL satisfies the selected security policy.

As indicated at block 314, according to some exemplary embodiments of the invention, the method may include validating an authentication server associated with the considered communication device, e.g., if the considered communication device is determined to satisfy the selected security policy.

As indicated at block 316, according to some exemplary embodiments of the invention, validating the authentication server may include comparing details, e.g., authentication and/or identification details, of the authentication server with stored server details, e.g., as described below.

According to some exemplary embodiments of the invention, authentication module 224 (FIG. 2) may be able to receive identification details from an authentication server 251 (FIG. 2) associated with AP 250 (FIG. 2). The identification details of server 251 (FIG. 2) may include, for example, a server certificate and/or an issuer signature, as are known in the art. Authentication module 224 (FIG. 2) may compare the identification details of server 251 (FIG. 2) with trusted server details of TSL 230. Based on the comparison between the identification details of server 251 (FIG. 2) and the trusted server details of TSL 230 (FIG. 2), authentication module 224 (FIG. 2) may determine the validity of authentication sever 251 (FIG. 2). For example, authentication module 224 (FIG. 2) may determine authentication server 251 (FIG. 2) is valid if the identification details of server 251 (FIG. 2) are included in TSL 230 (FIG. 2), as described below with reference to FIG. 4. According to some exemplary embodiments of the invention, the method may also include updating the stored server details based on predetermined authorization criteria, as described below with reference to FIG. 4, e.g., if the stored server details do not include the identification details of server 251 (FIG. 2).

Figure 4:
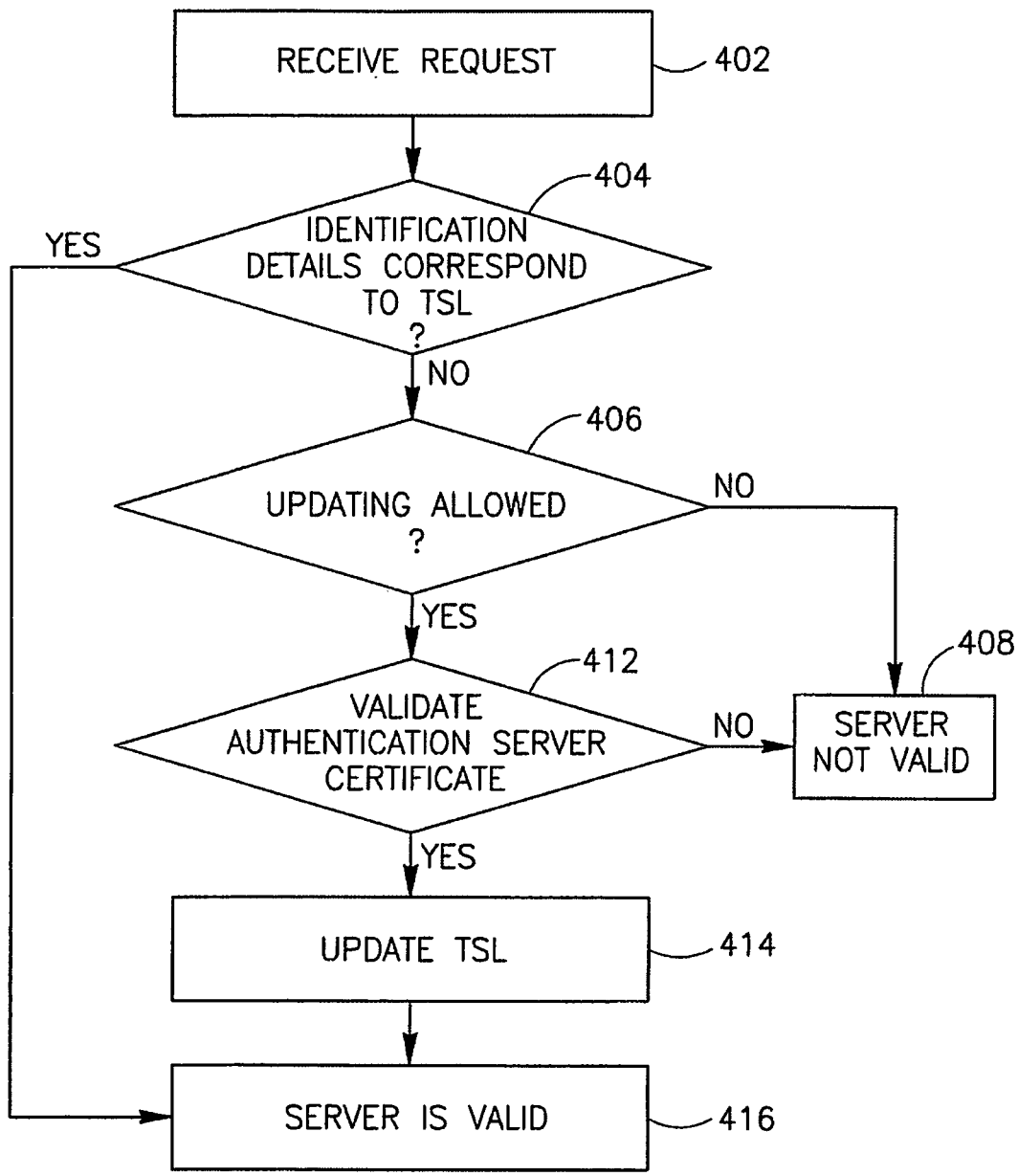
FIG. 4 is a schematic flow chart illustration of a method of validating an authentication server in accordance with some exemplary embodiments of the invention.

Reference is made to FIG. 4, which schematically illustrates a method of validating an authentication server according to some exemplary embodiments of the invention. Although the present invention is not limited in this respect, the method of FIG. 4 may be implemented by authentication module 224 (FIG. 2), e.g., to validate the authentication server of the considered AP.

As indicated at block 402, the method may include receiving from the authentication server an EAP request, for example, a "server hello" message and a certificate including identification information of the authentication server, e.g., as is known in the art.

As indicated at block 404, the method may include determining whether the identification information of the server corresponds to the stored server details, e.g., of TSL 230 (FIG. 2).

As indicated at block 416, the method may include determining the authentication server is valid, e.g., if the identification information of the server corresponds to the stored server details.

As indicated at block 406, the method may include determining, e.g., based on predefined authorization criteria, whether updating of the stored server details is allowed, e.g., if the identification information of the server does not correspond to the stored server details. The authorization criteria may include, for example, a user-specific authorization, e.g., predetermined by a Network Administrator (NA) and allowing the NA and/or one or more predetermined users to update the stored server details.

As indicated at block 408, the method may include determining that the authentication server is not valid, e.g., if the identification information of the server does not match the stored server details, in which case updating of the stored server details may be prohibited. For example, authentication module 224 may cause security module 232 to perform an "authentication-terminate" operation, if the authentication server is determined to be not valid.

As indicated at block 412, the method may include validating the certificate of the authentication server. This may include, for example, determining whether a certificate issuer of the server certificate is a trusted issuer, e.g., by comparing the certificate issuer of the certificate to one or more stored TRCs, e.g., as is known in the art. Validating the certificate may also include performing validation of the signature of the server certificate, e.g., using any suitable validation procedure as is known in the art.

According to some exemplary embodiments of the invention, the method may include determining that the authentication server is not valid, e.g., if the certificate of the authentication server is determined to be not valid.

As indicated at block 414, the method may include updating the stored server details to include the identification details of the authentication server, e.g., if the certificate of the authentication server is determined to be valid. For example, authentication module 224 (FIG. 2) may update TSL 230 (FIG. 2) to include the identification details of the authentication server.

Referring back to FIG. 3, as indicated at block 320, the method of selectively connecting to a communication device according to embodiments of the invention may include validating the user, e.g., the user of station 200 (FIG. 2). For example, interface 226 (FIG. 2) may prompt the user to provide user-identification details, e.g., a username and/or password, for connecting to the authentication server. Any other suitable user-validation procedure, e.g., using a user certificate, as is known in the art, may be implemented.

As indicated at block 324, the method of selectively connecting to a communication device according to embodiments of the invention may include selecting the considered communication device for connection, e.g., if the considered communication device is determined to correspond to the determined SC, the authentication server is determined to be valid, and the user is determined to be valid. For example, selector 228 (FIG. 2) may cause NIC 204 (FIG. 2), e.g., using suitable control signals, to establish a connection with the considered communication device.

As indicated at block 326, the method of selectively connecting to a communication device according to embodiments of the invention may also include identifying the considered communication device as a communication device corresponding to the determined SC. For example, selector 228 (FIG. 2) may be able to store a BSSID of the SS corresponding to the selected AP, e.g., in accordance with the scanning list. This may enable, for example, connecting, e.g., directly, to the selected communication device when the corresponding SC is selected.

Some exemplary embodiments of the invention are described above with reference to a station able to determine a SC for establishing a connection with an AP. However, it will be appreciated by those skilled in the art that other embodiments of the invention may be implemented by any one or more communication devices for establishing a connection. For example, the methods described above with reference to FIG. 3 and/or FIG. 4 may be modified to enable a first communication device, e.g., an AP, to determine one or more SCs, and to enable another device to establish a connection with the first device in accordance with the one or more determined SCs.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art It is, therefore, to be understood that the appended claims are intended to cover all such modifications and changes as fall within the true spirit of the invention.

What is claimed is:

1. A method comprising:
   determining by a first communication device a security class from a set of security classes each security class based at least on a type of encryption algorithm or a type of authentication method implemented by the first communication device for establishing secured data transactions between the first communication device and one of multiple available access points over a communication network;
   selecting by the first communication device a particular access point from among the multiple available access points for establishing a connection between the first communication device and the particular access point based on said security class, said particular access point selected satisfies a security policy of said security class; and
   validating an authentication server associated with said one of the multiple available access points in response to said one of the multiple available access points is determined to satisfy said security policy;
   wherein said determining comprises analyzing beacons from the access points to determine available encryption algorithms and authentication methods available from the access points,
   wherein said selecting said one of the multiple available access points comprises determining whether one or more security-related characteristics of a second communication device satisfy said security policy corresponding to said security class, and
   wherein said validating said authentication server comprises comparing between received identification details of said authentication server and stored server details.

2. The method of claim 1, wherein said determining whether said one or more security-related characteristics satisfy said security policy comprises determining whether an encryption algorithm implemented by said one of the multiple available access points satisfies said security policy.

3. The method of claim 1, wherein said determining whether said one or more security-related characteristics satisfy said security policy comprises determining whether an authentication method implemented by said one of the multiple available access points satisfies said security policy.

4. The method of claim 1, wherein said validating said authentication server comprises comparing between said received identification details and server details of a trusted server list.

5. The method of claim 1, comprising updating said stored server details based on predetermined authorization criteria.

6. The method of claim 1, wherein said selecting said one of the multiple available access points comprises selecting an access point considered for establishing communication.

7. An apparatus comprising:
   a processor; and
   a memory storing computer executable instructions that when executed by the processor, causing the processor to implement:
   a security-class software module for determining a security class from a set of security classes each security class based at least on a type of encryption algorithm or a type of authentication method implemented by the apparatus for establishing secured data transactions between the apparatus and one of multiple available access points over a communication network;
   a selector software module for selecting a particular one of the multiple available access points for establishing a connection between the apparatus and the selected particular one of the multiple available access points based on said security class, the selector software module for selecting the particular one of the available access points by determining whether one or more security-related characteristics of said selected particular available access point satisfy a security policy corresponding to said security class; and
   an authentication software module for validating an authentication server associated with the particular one of the available access points in response to said one of the available access points is determined to satisfy said security policy, said authentication software module to compare between received identification details of said authentication server and stored server details;
   wherein said determining comprises analyzing beacons from the access points to determine available encryption algorithms and authentication methods available from the access points, and
   wherein said particular access point selected satisfies said security policy of said security class.

8. The apparatus of claim 7, wherein said one or more security-related characteristics comprise one or more security-related characteristics selected from the group consisting of an encryption algorithm implemented by the particular one of the available access points, and an authentication method implemented by the particular one of the available access points.

9. The apparatus of claim 8, comprising a beacon analyzer software module for determining said encryption algorithm by analyzing a beacon received from the particular one of the available access points.

10. The apparatus of claim 7, wherein said stored server details comprise server details stored in a trusted server list.

11. The apparatus of claim 7, wherein said authentication software module for updating said stored server details based on predetermined authorization criteria.

12. A wireless communication device comprising:
   an omni-directional antenna able to receive signals from one or more other wireless communication devices;
   a processor; and
   a memory storing computer executable instructions that when executed by the processor, causing the processor to implement:
   a security-class software module for determining a security class from a set of security classes each security class based at least on a type of encryption algorithm or a type of authentication method implemented by the wireless communication device for establishing secured data transactions between the wireless communication device and one of multiple available access points over a communication network; and a selector software module for selecting a particular one of the available access points for establishing a connection between the wireless communication device and the selected particular one of the available access points based on said security class, the selector software module for selecting the particular access point by determining whether one or more security-related characteristics of the particular access point satisfy said security policy corresponding to said security class; and an authentication software module for validating an authentication server associated with the particular one of the available access points in response to said one of the available access points is determined to satisfy said security policy, the authentication software module to compare between received identification details of said authentication server and stored server details;

wherein said determining comprises analyzing beacons from the access points to determine available encryption algorithms and authentication methods available from the access points, and wherein said particular access point selected satisfies said security policy of said security.

13. The wireless communication device of claim 12, wherein said one or more security-related characteristics comprise one or more security-related characteristics selected from the group consisting of an encryption algorithm implemented by the particular access point, and an authentication method implemented by the particular access point.

14. A wireless communication system comprising:

a wireless communication device comprising a memory storing computer executable instructions that when executed by the wireless communication device, causing the wireless communication device to implement:

a security class software module for determining a security class from a set of security classes each security class based at least on a type of encryption algorithm or a type of authentication method implemented by a first communication device for establishing secured data transactions between the wireless communication device and one of multiple available access points over a communication network; and a selector software module for selecting a particular access point from among the multiple available access points for establishing a connection between the wireless communication device and the selected particular access points based on said determined security class, said selector software module for selecting the particular access point by determining whether one or more security-related characteristics of the particular access point satisfy said security policy corresponding to said determined security class;

an authentication software module for validating an authentication server associated with the particular one of the available access points in response to said one of the available access points is determined to satisfy said security policy, the authentication software module to compare between received identification details of said authentication server and stored server details;

wherein said determining comprises analyzing beacons from the multiple access points to determine available encryption algorithms and authentication methods available from the access points, and wherein said particular access point selected satisfies a security policy of said security class.

15. The system of claim 14, wherein said one or more security-related characteristics comprise one or more security-related characteristics selected from the group consisting of an encryption algorithm implemented by the particular access point, and an authentication method implemented by the particular access point.

16. An article comprising a non-transitory computer readable storage medium having stored thereon instructions that, when executed within a first communication device, result in:

determining a security class from a set of security classes each security class based at least on a type of encryption algorithm or a type of authentication method implemented by the first communication device for establishing secured data transactions between the first communication device and one of multiple available access points over a communication network;

selecting a particular one of the multiple available access points as a second communication device based on said security class;

validating an authentication server associated with said one of said multiple available access points in response to said one of multiple available access points is determined to satisfy a security policy of said security class; and connecting to the selected particular one of the multiple available access points; wherein said determining comprises analyzing beacons from the access points to determine available encryption algorithms and authentication methods available from the access points, wherein said particular access point selected satisfies the security policy of said security class, wherein selecting the second communication device comprises determining whether one or more security-related characteristics of said second communication device satisfy said security policy corresponding to said security class, and wherein said validating said authentication server comprises comparing between received identification details of said authentication server and stored server details.

17. The article of claim 16, wherein the instructions resulting in determining whether said one or more security-related characteristics satisfy said security policy comprise instructions resulting in determining whether at least one of an encryption algorithm implemented by said second communication device and an authentication method implemented by said second communication device satisfies said security policy.

* * * * *

UNITED STATES PATENT AND TRADEMARK OFFICE
CERTIFICATE OF CORRECTION

PATENT NO.       : 8,413,213 B2
APPLICATION NO.  : 11/022871
DATED            : April 2, 2013
INVENTOR(S)      : Claudio Glickman It is certified that error appears in the above-identified patent and that said Letters Patent is hereby corrected as shown below:

Title Page, Item (56), in column 2, under "Other Publications", line 2, delete "www..cosuser..com" and insert -- www.cosuser.com --, therefor.

In the Claims:

In column 15, line 4, in claim 12, delete "network; and" and insert -- network; --, therefor.

In column 15, line 39, in claim 14, delete "security classes" and insert -- security-classes --, therefor.

Signed and Sealed this
Twenty-first Day of May, 2013

Teresa Stanek Rea
*Acting Director of the United States Patent and Trademark Office*